Patented June 23, 1931

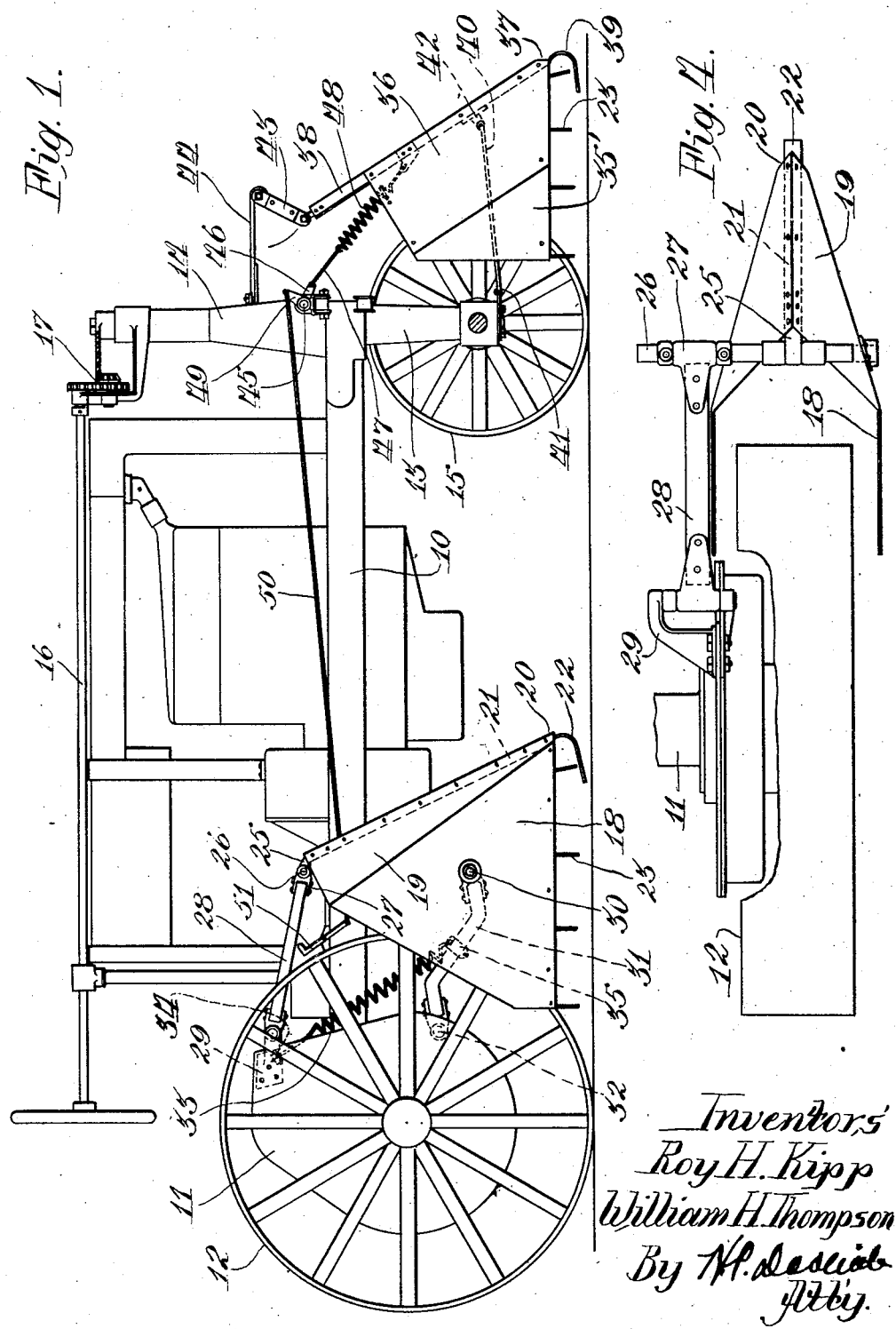

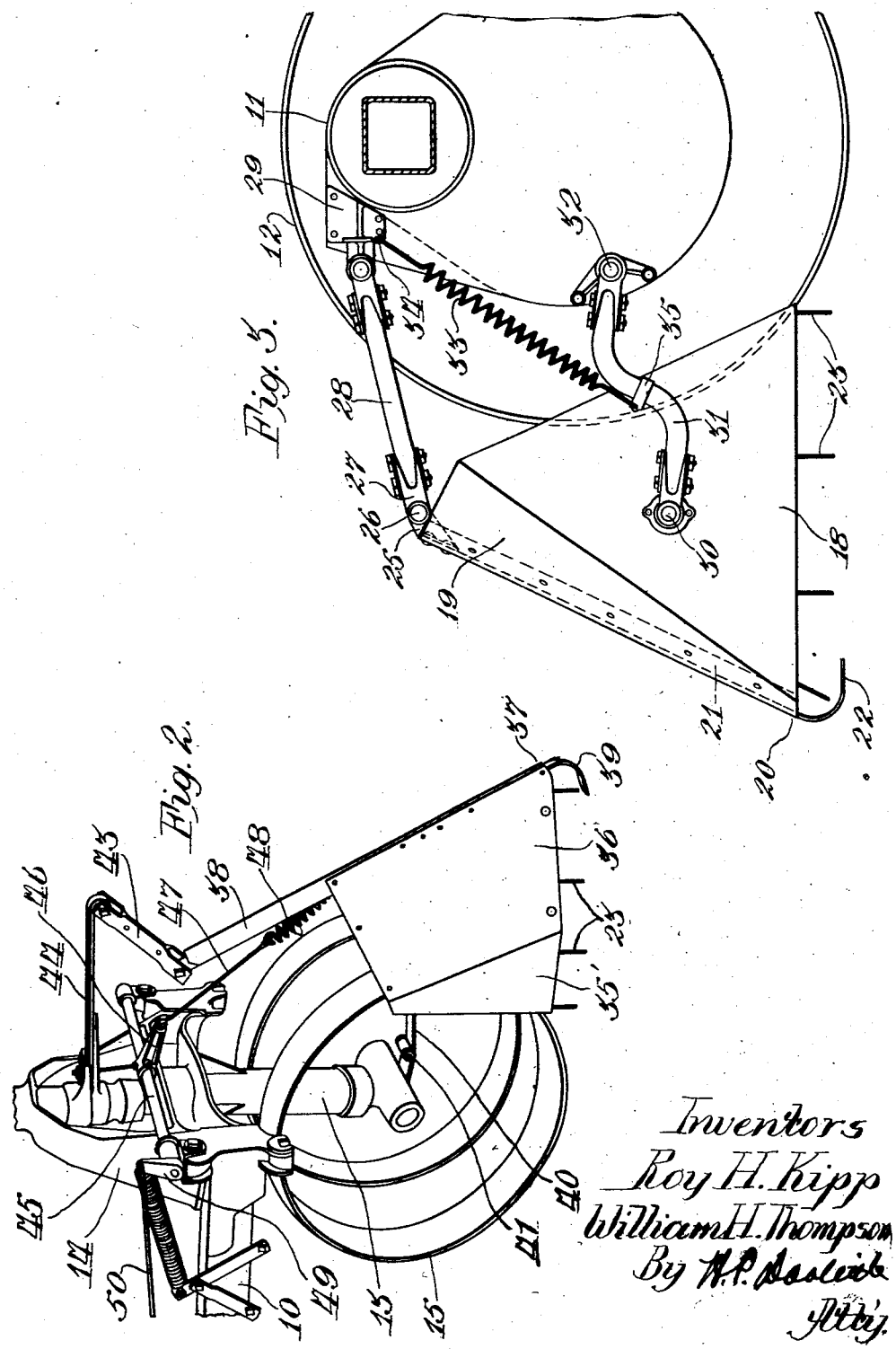

1,811,054

UNITED STATES PATENT OFFICE

ROY H. KIPP AND WILLIAM H. THOMPSON, OF CANTON, ILLINOIS, ASSIGNORS TO INTERNATIONAL HARVESTER COMPANY, A CORPORATION OF NEW JERSEY

TRACTOR WHEEL FENDER

Application filed April 8, 1929. Serial No. 353,383.

The present invention relates to an attachment for tractors when used for work on row grown crops, and more particularly to a fender attachment for the tractor wheels. The principal object of the invention is to provide simple and efficient means for lifting and turning aside stalks, such as corn or cotton, which are fallen or inclined from the plant row, so that they will not be run over by the tractor wheels but will be pushed aside and lifted into position for action thereon by whatever cultivating, stalk cutting, or harvesting mechanism the tractor may carry. A further object is to provide an attachment of this type which will have free floating movement vertically and one which, when attached to the steering wheel of the tractor, will follow the angular movements of that wheel during operation.

Further objects and advantages will become apparent from the following more detailed description in connection with the accompanying drawings where:

Figure 1 is a side elevation of a tractor with the fenders of this invention applied to the wheels;

Figure 2 is a perspective view of the tractor steering truck with the fender mounted thereon;

Figure 3 is a side elevation viewed from the inner side of the traction wheel, showing the rear wheel fender in position; and, Figure 4 is a plan view of the fender shown in Figure 3.

In the present instance the novel fender structure comprising the invention has been illustrated as applied to a tractor of the row crop type having a wide tread rear axle spanning two plant rows and a central forward steering truck traveling in the space between the two rows spanned by the rear wheels. Such a tractor comprises a narrow, longitudinally extending body 10 carrying the power plant of the tractor, an arched rear axle structure 11 on which are the traction wheels 12, and a front steering truck 13 having a vertical standard swiveled in a casting 14 on the front end of the tractor frame. The steering truck is preferably provided with a pair of supporting wheels 15 and is controlled through a steering rod 16 connected by suitable gearing 17 to the vertical standard of the truck.

In the practice of the invention, fenders are applied to the steering truck and to each traction wheel in such a manner as to deflect stalks into the space at each side of the truck and within the tread lines of the traction wheels where the mechanism for operating on stalks in the plant row or for cultivating the sides of the row may be located. The fenders for the front truck and for the traction wheels, respectively, are different in certain details of construction, but are generically the same. The structure of the traction wheel fender will first be described. In the present instance, this consists of an arched sheet metal structure having sides 18 and a top portion 19. The sides and top portion converge forwardly to an apex 20 which is located on the plane of the lower edge of the fender structure and adjacent the ground surface.

The sheet metal sides and top of the fender structure are secured to a central ridge bar 21 indicated in dotted lines in the respective figures. The lower end of this bar extends beyond the fender and is curved rearwardly, as at 22, to form a shoe or runner for the apex or nose of the fender. Depending teeth 23 are preferably secured to the lower edge of the sides of the fender to deflect and pick up stalks lying on the ground. The upper end of ridge bar 21 has secured to it a pivot bracket 25 having a horizontal bearing in which there is journaled a transverse shaft 26 extending inwardly towards the tractor. The inner end of shaft 26 is journaled in a bearing 27 on the forward end of a forwardly extending upper supporting bar 28, the rear end of which is pivoted on a horizontal axis in a bracket 29 on the axle structure of the tractor. At approximately its center the fender structure carries a transverse shaft 30 in the same vertical transverse plane as the shaft 26. The shaft 30 extends inwardly from the fender towards the tractor and serves as the pivot for a second forwardly extending bar 31, the rear end of which is pivoted on a horizontal axis to the axle structure of the tractor at 32, as best seen in Figure 3. The bar 31 is in the same vertical, longitudinal plane as the upper bar 28, and together they form a floating, parallel link supporting structure pivoted on horizontal axes to the fender and tractor, respectively. In order to yieldably support the fender in position, a coil spring 33 is provided, which may be connected to an eye 34 on the bracket 29, at its upper end, and to a collar 35 intermediate the ends of the bar 31, at its lower end.

The fender structure for the steering truck is in general of the same construction as that of the traction wheel fender and comprises an arched sheet metal structure having side portions 35' and top portions 36. Like the traction wheel fender, this structure tapers or converges to an apex 37 located on the plane of the lower edge of the fender structure. The two lateral halves of the sides and top are secured to a rigid member or bar 38 which extends below the fender to form the rearwardly curved shoe or runner 39. Teeth 23, similar to those described in connection with the rear fender are preferably provided on the front fender also. The supporting means for the front fender preferably comprise a lower, forwardly extending bar 40 which is pivoted on a horizontal axis to the truck, as at 41, at a point between the two wheels of the truck. The forward end of this bar is pivoted on a horizontal axis, as at 42, to the ridge bar 38. The upper end of ridge bar 38 is extended upwardly above the top of the fender and is pivoted to the lower end of a depending link 43, the upper end of which is pivoted on a forwardly extending arm 44, which is detachably but rigidly secured to the steering post or standard of the truck and shares in its angular movement when the tractor is steered and, therefore, carries the fender with it. The fender structure for the steering truck is preferably provided with means for lifting the fender from the ground during turning movement, this lifting means also including a yieldable supporting element for the fender structure.

In the present instance, the lifting and supporting means comprises a rockshaft 45 (Figure 2) mounted on the forward end of the tractor and provided with a central crank arm 46, on the end of which there is pivoted a lifting rod 47 which is connected by means of a coil spring 48 to the ridge bar 38 of the fender. The rockshaft 45 is also provided with a vertical crank 49 which is connected by means of a rearwardly extending rod 50 to a foot pedal lever 51 adjacent the driver's station on the tractor. Actuation of the pedal will rock the crank arm 46 upwardly, exerting a pull on the rod 47 and spring 48 and causing the fender structure to be raised on the pivoted bar 40, thus causing the link 43 to swing upwardly under the arm 44, as indicated by the arrow in Figure 1.

There has accordingly been provided a fender structure for tractor wheels embodying an arched fender structure which embraces the forward tread portion of the wheel and is shaped to lift and deflect stalks in an efficient manner. The structure is also characterized by being spring supported and provided with connections to the tractor which permit the fender to have floating movement vertically during travel of the tractor. A further characteristic relating to the front fender structure is that the fender will follow the angular movements of the truck during turning of the tractor and may be lifted well above the soil, if desired. The structure described exemplifies a preferred form of the invention, but variations therefrom are contemplated within the scope of the following claims.

What is claimed is:

1. The combination with the traction member of a tractor, of a fender comprising an arched structure embracing the forward tread portion of the traction member and formed with its sides and upper portion converging to a forward apex located on the plane of the lower edge of the structure, a forwardly extending link connecting said structure to the tractor and pivoted to both on horizontal axes, and resilient means for supporting said structure in position.

2. The combination with a tractor having a dirigible supporting wheel, of an arched fender embracing the forward tread portion of the wheel, vertically shiftable means connecting the fender to the tractor comprising vertically spaced links pivoted to both on horizontal axes, and means for raising and lowering the fender including a control element mounted on the tractor adjacent the operator's station and having a yielding spring connection with the fender.

3. The combination with a tractor having a dirigible front truck including an upright standard swiveled to the tractor frame, of an arched fender embracing the forward portion of the truck, a forwardly extending bar connecting the lower portion of the truck to the fender and pivoted to both on horizontal axes, a supporting bar extending from the truck standard, a flexible connection between the supporting bar and the fender, and means on the tractor for raising and lowering the fender.

4. A stalk lifting fender for ground wheels comprising an arched sheet metal structure formed with its sides and top converging to an apex located on the plane of the lower edge of the structure, said structure being open at its rear and under sides to adapt it to embrace the forward portion of a wheel, rake-like teeth depending from the lower edge of the structure, and means on said structure for supporting it in position on a vehicle.

5. A stalk lifting fender for ground wheels comprising an arched sheet metal structure having a longitudinally extending central forwardly and downwardly inclined ridge bar at its upper side to which the side portions converge and are secured, the structure being tapered forwardly to an apex located on the horizontal plane of its lower edge, said structure being open at its rear and under sides to adapt it to embrace the forward portion of a wheel, and means carried by the ridge bar for supporting the structure in position on a vehicle.

In testimony whereof we affix our signatures.

ROY H. KIPP.
WILLIAM H. THOMPSON.